May 19, 1959
J. KUSHION
2,886,895
TOOL LOCATING GAUGE
Filed Sept. 12, 1955
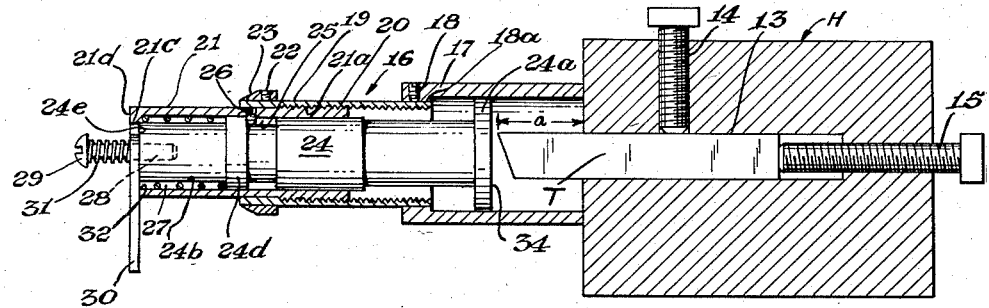
Fig. 1
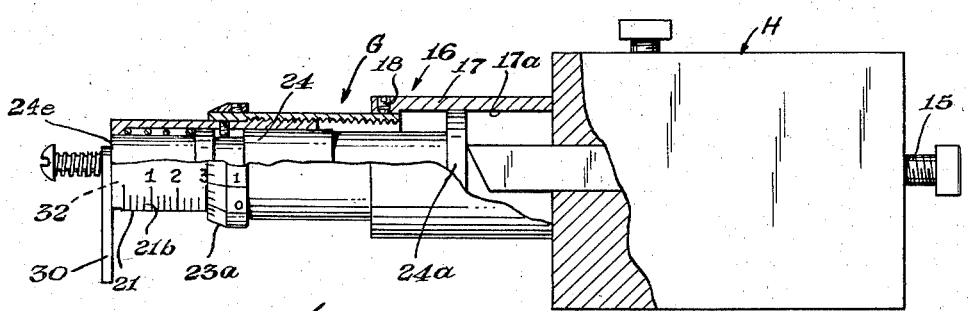
Fig. 2
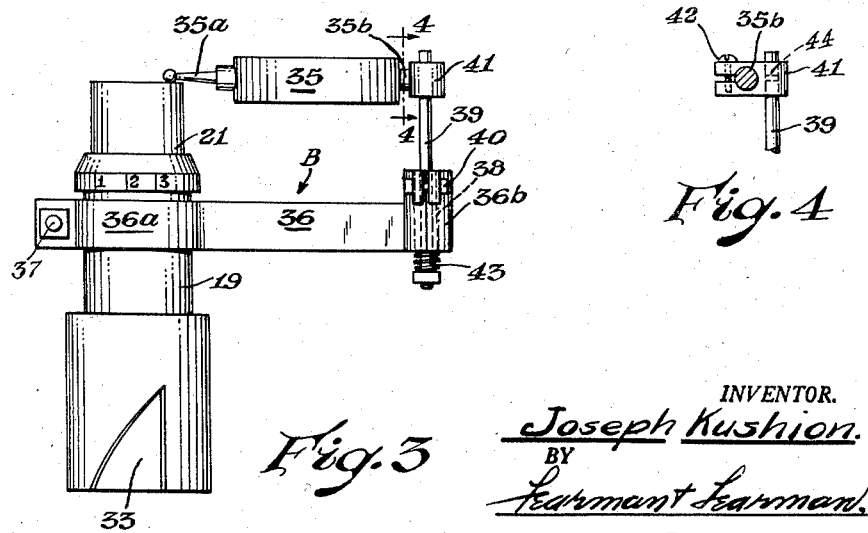
Fig. 3
Fig. 4
INVENTOR.
Joseph Kushion.
BY
Learmant Learman
ATTORNEYS

United States Patent Office 2,886,895
Patented May 19, 1959

2,886,895

TOOL LOCATING GAUGE

Joseph Kushion, St. Charles, Mich.

Application September 12, 1955, Serial No. 533,775

11 Claims. (Cl. 33—185)

This invention relates to projection gauges and more particularly to a novel and improved gauge which may be employed to locate cutting tools in their holders.

Fairly frequently during a machining operation a conventional single point tool or the like will suddenly snap or will become so dull that it must be replaced. Once the old tool has been removed from the tool holder, the machinist must obviously locate the new tool so that it extends from the tool holder exactly the same distance as did the former tool if he is to continue the cut. This may be a tedious and time consuming operation for, as those familiar with the problem realize, it is not an easy task to locate the tool within a few thousandths or ten thousandths of an inch and as much as an hour's time or more may be required if the trial and error method of locating is used.

One of the prime objects of the instant invention is to design a gauge which may be very readily used to accurately measure the distance a given tool extends from its holder before the taking of a cut and can thence be employed to immediately locate a substituted tool in exactly the same position if the cut must be interrupted to replace the first tool.

A further object of the invention is to design a gauge having an indicating spindle with a spring loaded, tool engaging plunger therein movable axially with respect to the spindle so that the reading can be taken at a given position of the spindle when a transverse surface on the plunger comes into planar relation with a similar surface on the spindle, the machinist ascertaining that the surfaces are flush and the reading can be taken by "feel" or by employing an indicator.

A further object of the invention still is to provide a tool setting gauge wherein the accuracy of the measurement taken is not dependent on the frequently varying degree to which the measuring spindle is moved into engagement with the work and the relative hardness of the spindle or tool end are not factors in the measurement.

Another object of the invention is to provide a tool setting gauge wherein the spindle plunger is resiliently supported so that neither the gauge nor the tool will ever be damaged one by the other, and the gauge tool-contacting surface will not wear rapidly or easily become scratched.

A further object of the invention is to provide a gauge which can be very readily applied to a tool holder to measure the distance the cutting tool extends therefrom, the tool having substantially an annular bearing surface so that the gauge is automatically squared with the holder in parallel relation with the extending tool when it is applied to the holder.

Another object of the invention is to design a tool setting gauge which can be handled with one hand in places where access to the tool is limited.

A still further object of the invention is to provide a highly reliable, tool setting gauge of simple and practical design which can be very economically manufactured and sold.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

In the drawings:

Fig. 1 is a partly sectional side elevational view showing the gauge applied to the tool holder.

Fig. 2 is a similar view, however the spindle has been adjusted forwardly and the plunger has been pressed rearwardly relative to the spindle by the tool to a position in which the indicating surfaces on the gauge are flush and the reading can be taken.

Fig. 3 is a top plan view showing an indicator mounted in position on the gauge to determine whether the indicating surfaces on the gauge are absolutely flush.

Fig. 4 is a fragmentary view taken on the line 4—4 of Fig. 3.

Referring now more particularly to the accompanying drawings in which I have shown a preferred embodiment of the invention, a letter G generally indicates my gauge which is shown applied to a tool holder H having a tool T extending therefrom. The holder H is conventional in design and as simply shown is provided with a tool receiving socket or recess 13 shaped to the tool. A set bolt 14 which is threaded in the holder H may be employed to clamp the single point tool T in position. It should be understood that the particular holder and tool shown could be of greatly varying design and only illustrate a particular holder and tool with which my gauge may be very nicely used.

If the tool T snaps during a cut so that it is necessary to replace it, it is necessary that the replacing tool extend also exactly the distance "a" from the holder. The set bolt 15 is threaded through the rear of the holder and into engagement with the tool, however the bolt 15 cannot be used to locate a substituted tool because tools differ in length dependent on wear and the number of times they have been reground or sharpened. The gauge which will now be described is particularly designed to assist in the rapid and accurate replacement of such a tool.

As seen particularly in Figs. 1 and 2, the gauge comprises a barrel 16 which is made up of an annular holder engaging sleeve 17 fixed by means of set screws 18 through the flange 18a thereof to a sleeve 19. Micrometer threads 20 are provided internally on the sleeve 19 for the purpose of receiving a tubular spindle 21 which has cooperating threads 21a. Secured on the rear end of the sleeve 19 by set screws 22 is a collar 23 which is provided with circumferentially spaced indicia 23a and it will be observed that a cooperating longitudinal scale 21b is provided on the axially adjustable spindle 21. A plunger 24 with a head 24a enlarged so as to slidably engage the interior surface 17a of the holder engaging sleeve 17 is received within the spindle 21 and is capable of a limited axial movement therein. Provided in the body of the plunger at 25 is an annular groove adapted to accommodate set screws 26 which extend through the wall of the spindle 21 and have a limited longitudinal play in the groove 25 when the plunger 24 moves relatively to the spindle 21. The rear end of the plunger 24 is reduced in diameter as at 24b to receive a coil spring 27 under compression which is disposed between an internal shoulder 21c on spindle 21 and the shoulder 24d of the plunger 24. The spring 27 urges the plunger 24 forwardly and normally maintains it in the position in which it is shown in Fig. 1. In this position the rear end face 24e of the plunger is disposed forwardly or inwardly of the rear end wall 21d of the spindle 21.

Provided in the end of the plunger 24 is a threaded opening 28 which receives a screw 29 and a finger or arm 30 which is mounted on the screw is urged inwardly by the coil spring 31. A notch 32 in the end of spindle 21 accommodates the finger 30 when the plunger 24 is in normal position as in Fig. 1 and the notch is just deep enough so that the inner surface of arm 30 is normally flush (see Fig. 1) with the indicia beginning the scale 21b on the spindle.

Inasmuch as the gauge will be employed primarily with turning tools and the like, a triangular opening 33 is cut in the sleeve 17 so that the barrel need not be applied over the end of the tool T, but may be simply placed in position with the opening 33 passing the tool. A Carboloy (carbide) facing 34 is preferably provided on the front wall of the plunger to minimize wear and scoring thereof since the tools being located will in many instances be carbide tipped tools.

In practice when a tool T is inserted in the holder to commence a cut, the gauge is placed in position as in Fig. 1 with the front wall of sleeve 17 in engagement with the flat end of the holder H. Since the front wall of sleeve 17 is substantially annular and the front face thereof is ground perpendicular to the axis of the sleeve, plainly the gauge will be parallel to the tool T which projects perpendicularly from the front face of the holder if the wall of the sleeve is at all points in engagement with the holder. The spindle 21 is then adjusted inwardly until the plunger 24 is forced outwardly against the spring 27 into a position in which its end wall 24e is flush with the end face 21d of the spindle 21, and a reading is taken from the micrometer scales 23a and 21b. The machinist can ascertain that the surfaces 24e and 21d are flush by rubbing a fingernail across them, or if extremely close tolerance requirements are to be observed an indicator may be employed.

In Fig. 3 I have shown an indicator 35 which has an attachment arm 35a and a mounting shank 35b and may be of exactly the construction shown in Wells Patent No. 2,345,845. The indicator is supported on the sleeve 19 by a novel bracket B which includes a clamp arm 36 having split clamping rings 36a and 36b on the ends thereof. The ring 36a may be secured on the sleeve 19 of the gauge with a screw 37 and the ring 36b clamps a sleeve 38 in which a support rod 39 is axially slidable as shown, a screw 40 clamping the split ring in the same manner.

The rod 39 has a depending split ring clamp 41 (see Fig. 4) which receives the mounting shank 35b of the indicator and a screw 42 closes the clamp 41 about the shank as shown. The clamp 41 is axially immobile on rod 39 (key 44) but can be rotated thereon so that the ball of the attachment arm 35a can be wiped across the surfaces 21d and 24e. If the surface 21d is not quite flush with surface 24e the indicator pointer will be moved and clearly the spring biasing the attachment arm will be compressed somewhat when the arm is mounted in the position shown. A spring 43 in compression on the rod 39 which maintains the attachment arm 35a in engagement with the surfaces 21d and 24e permits axial movement of rod 39 if the spindle 21 is to be adjusted.

Once the reading is taken it is recorded and thereafter if the tool T must be replaced, the replacing tool can obviously readily be clamped in the holder in exactly the same position. If the gauge G at the same reading is placed over the tool with the tool adjustably clamped in a position whereby it does not quite push the plunger 24 outwardly far enough so that the surface 24e is flush with the surface 21d, the set bolt 15 can be adjusted until it forces the tool outwardly the proper distance. When the surfaces are flush, obviously the new tool extends exactly the same distance from the holder as did the tool it replaced. Where possible, the tool T will always be placed in a position whereby it extends the same distance from the holder at the commencement of a cut so that the reading will become a standard and can be committed to memory. The finger 30 which extends radially outward from the spindle 21 can be used to measure distances between it and the front end of the sleeve 17 where the gauge cannot be used as described because the tool is of such size that it will not fit within sleeve 17. Movement of the plunger 24 within the spindle 21 is limited by the width of groove 25.

It should be apparent that I have perfected a gauge of greatly improved construction which will permit a considerable saving in the labor time required to perform various cutting operations and will eliminate much of the down time on lathes and the like.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. In a gauge for measuring the distance a tool projects from its holder, a barrel for accommodating the projecting tool including a section adapted to be placed with its one end in engagement with the holder, a spindle having axial adjustment relative to said barrel in said barrel, indicia on the barrel, a cooperating scale on said spindle, means within said spindle and having a limited axial movement therein adapted to engage the end of said tool, said means and spindle having exposed portions which when in a predetermined relation signify that a reading can be taken.

2. In a gauge for measuring the distance a tool projects from its holder, a barrel for accommodating the tool having a surface for engaging the holder, a tubular spindle threaded in said barrel and having axial adjustment therein, indicia on said barrel, a cooperating longitudinal scale on said spindle, a plunger within said spindle having a limited axial movement therein, spring means urging said plunger forwardly toward the said surface of the barrel and holding said rear end of the plunger inward of the rear end of the spindle a limited distance, said end of the plunger and end of the spindle being ground flat so that when the tool forces the plunger outwardly such that the said ends are in flush relation, a reading can be taken.

3. The combination defined in claim 2 in which a radially projecting measuring finger is mounted on the end wall of said plunger and said spindle has a notch therein to accommodate the finger in a position in which its inner face is flush with the indicia mark beginning the longitudinal scale.

4. The combination defined in claim 3 in which a screw is threaded into the end wall of said plunger and the finger is mounted thereon, a spring under compression being provided on the screw to urge the finger inwardly.

5. The combination defined in claim 2 in which a clamp arm extends laterally from one of said barrel and spindle, a support rod parallel to the axis of said spindle and axially movable in said arm, and an indicator rotatable on said rod having its attachment arm substantially in engagement with the rear end of the spindle.

6. In a gauge for measuring the distance a tool projects from its holder, a barrel member comprising an annular sleeve with a flat peripheral end wall for engaging the front face of the holder around the tool, and a sleeve of reduced diameter relative thereto accommodated partially therein and extending outwardly therefrom, the said reduced portion having micrometer threads formed in the bore thereof, a tubular spindle threaded into said sleeve of reduced diameter and extending outwardly therefrom, a beveled collar on the outer end of said sleeve of reduced diameter having circumferentially spaced indicia thereon, a longitudinal scale on the outer end of said spindle cooperating with said indicia so that a reading can be obtained from said indicia and scale, a plunger slidable in said spindle having an enlarged head, slidable in said holder engaging sleeve, said head being of sufficient diameter to restrict outward movement of the plunger, the plunger having an outer end of reduced diameter relative to the spindle and the spindle having an internal shoulder slidable on said end of reduced diameter, helical spring means between said internal shoulder and the shoulder formed by reducing the end of the plunger normally urging the plunger inwardly toward the tool and disposing the head of the plunger a spaced distance inwardly of the reduced sleeve member of the barrel, the length of the plunger being such relative to the spindle that the outer end of the plunger is normally disposed by the spring inward of the outer end of the spindle, and an indicator on said spindle with its indicating arm radially disposed relative to the spindle and in engagement with the end of the spindle at the inner peripheral edge thereof, said outer ends of the spindle and plunger being perpendicular to the common axis thereof so that when the tool has forced the plunger rearwardly a distance such that the indicator shows that the outer ends of the spindle and plunger are in flush relationship, the reading can be taken.

7. Apparatus for measuring the distance an article held in a holder projects from the latter, said apparatus comprising a base having a holder engaging portion; a spindle having threads cooperating with a threaded bore in said base and movable axially relative to said base on relative rotation of said spindle and base; article engaging means associated with said spindle and having a limited axial movement relative to said spindle; and cooperable indicia on said base and article engaging means and on said spindle for indicating by their relative positions a particular degree of projection of said article from the holder.

8. Apparatus for measuring the distance an article held in a holder projects from the latter, said apparatus comprising a pair of telescoping members, one of which is capable of sliding axial movement relative to the other upon engagement with said article to vary its axial position with relation to the other member, said other member having a portion engageable with the holder from which the article projects and a portion having a micrometer thread connection with said portion movable axially relative thereto on relative rotation of said portions, said article engaging member and said other member having exposed reference portions which when in predetermined relative position indicate a particular degree of projection of said article from the holder.

9. The combination defined in claim 8 in which spring means is provided operative between said pair of telescoping members to oppose relative axial movement thereof in one direction.

10. Apparatus for measuring the distance an article held in a holder projects from the latter, said apparatus comprising; a pair of telescoping members, one of which is capable of sliding axial movement relative to the other upon engagement with said article to vary its axial position with relation to the other member, said other member having a barrel portion engageable with the holder from which the article projects; said article engaging member and said other member having exposed reference portions which when in predetermined relative position indicate a particular degree of projection of said article from the holder; said other member including a spindle portion in threaded relation with said barrel portion so that said spindle portion has axial adjustment relative to said barrel portion.

11. Apparatus for measuring the distance an article held in a holder projects from the latter, said apparatus comprising; a pair of telescoping members one of which is capable of sliding axial movement relative to the other upon engagement with said article to vary its axial position with relation to the other member, said other member having a portion in engagement with the holder from which the article projects, said article engaging member and said other member having exposed reference portions which when in predetermined relative position indicate a particular degree of projection of said article from the holder; a bracket supported on said apparatus; an indicator having an attachment arm extending laterally to the axis of the gauge, rotatable on said gauge in a plane perpendicular to the axis of the gauge so that the attachment arm can be wiped across said exposed reference portions and detect a variance in their alignment.

References Cited in the file of this patent

UNITED STATES PATENTS

| | | |
|---|---|---|
| 2,105,962 | Bickel | Jan. 18, 1938 |
| 2,344,498 | Coward | Mar. 21, 1944 |
| 2,445,176 | Hoffman | July 13, 1948 |
| 2,474,294 | Weeks | June 28, 1949 |
| 2,520,022 | Vobeda | Aug. 22, 1950 |
| 2,597,030 | Pistoles | May 20, 1952 |

FOREIGN PATENTS

| | | |
|---|---|---|
| 596,472 | Great Britain | Jan. 5, 1948 |
| 180,741 | Austria | Jan. 10, 1955 |